United States Patent [19]
Russell

[11] Patent Number: 4,572,425
[45] Date of Patent: Feb. 25, 1986

[54] REUSABLE CONTAINER

[76] Inventor: William S. Russell, 2 Teague Dr., No. Salem, N.H. 03073

[21] Appl. No.: 519,325

[22] Filed: Aug. 1, 1983

[51] Int. Cl.$^4$ ............................................. B65D 5/10
[52] U.S. Cl. ................................ 229/39 R; 229/44 R
[58] Field of Search ............................ 229/39 R, 44 R

[56] References Cited
U.S. PATENT DOCUMENTS

| | | | |
|---|---|---|---|
| 3,770,187 | 11/1973 | Faires et al. | 229/39 R |
| 4,013,213 | 3/1977 | Giebel | 229/39 R |
| 4,017,018 | 4/1977 | Pellation | 229/39 R |
| 4,238,068 | 12/1980 | Ellerbe et al. | 229/39 R |
| 4,260,100 | 4/1981 | Hoffman | 229/39 R |
| 4,279,379 | 7/1981 | Lohrbach et al. | 229/39 R |

Primary Examiner—Joseph Man-Fu Moy
Attorney, Agent, or Firm—Thomas C. Stover, Jr.

[57] ABSTRACT

A box-like container of corrugated plastic web having a pair of side walls and end walls is provided. The first side wall has a fold with a rectangular flap hingeably mounted thereto; each end wall has a hingeably mounted end flap having a slant edge terminating in an off-center blunt apex. The other side wall has a hingeably mounted triangular flap which terminates in a blunt substantially central apex. Accordingly, the first side flap is foldable toward the container and the end flaps are foldable thereover to define a substantially central slot with the first side flap and the (second side) triangular flap is foldable over the other flaps with the central apex being insertable into the slot to interleave the other flaps in an interlocking configuration.

In one embodiment the container has top flaps and similar bottom flaps mounted to the container walls, which flaps are recloseable to form a closed container and openable to permit the container to be compressed into lay-flat form.

In another embodiment the container has such closeable flaps mounted on one end of the side walls and is open at the other end of the side walls to form when the flaps are closed, container halves for use separately or in combination with another container half to form a telescoping, closeable container.

10 Claims, 7 Drawing Figures

REUSABLE CONTAINER

BACKGROUND OF THE INVENTION

1. Field of the Invention

This invention relates to box-like containers, particularly plastic box-like containers having interlocking flaps.

2. The Prior Art

Numerous foldable cardboard boxes have been designed for shipment and storage of goods in various industries, for example, boxes for shipment of goods to a supermarket. Though often such boxes are cut open and not recloseable, several attempts have been made to design boxes with folding flaps that can be opened and reclosed with interlocking flaps to attain a measure of reusability; see for example, U.S. Pat. No. 2,337,039 to Gardner (1941), U.S. Pat. No. 2,713,965 to Acker (1953) and U.S. Pat. No. 3,770,187 to Faires, et al (1973). These boxes are characterized by various cutout designs in their flaps, i.e. the end flaps and particularly in the opposed side flaps which interlock to close the box. Such cut-outs, while enhancing the lockability of such flaps also cause a weakness in the flap structure, which can result in bending, creasing or tearing thereof as the boxes are opened and closed. Accordingly these boxes soon deteriorate in shipping and handling, can no longer be reused and must be disposed of e.g. transported to an incinerator. Accordingly due to the above structural weaknesses and the susceptibility of cardboard, the usual box material, to wear and tear, there is a constant problem of disposal and replacement of the above prior art boxes or cartons with closable flaps and there is a need and market for an improved flap box design which substantially overcomes the above prior art shortcomings.

There has now been developed an improved container or box of improved and simplified design, having closable flaps which are durable and strong, the container having flaps which interlock for protection of goods in shipment and storage, which flaps readily reopen for removal of such goods and which container readily lays flat for storage or return shipment thereof for multi-use reuseability thereof.

SUMMARY

Broadly the present invention provides a container of plastic having an opposed pair of side walls joined by a pair of end walls, the first side wall having a first side flap with a continuous leading edge, which flap is hingeably mounted thereto, each end wall having a hingeably mounted end flap having a slant-edge terminating in an off-center, blunt apex and the other side wall having a hingeably mounted (second side) triangular flap terminating in a blunt, substantially central apex, such that the first side flap is foldable toward the container and the end flaps are foldable thereover to define a substantially central slot with the first side flap and the second side flap is foldable over the other flaps, with the central apex (or tab) being insertable into the slot to interleave the other flaps in an interlocking configuration.

In one embodiment the container of the invention has top flaps and similar bottom flaps which are reclosable to form a closed container and openable to permit the container to be compressed into lay-flat form.

In another embodiment the container of the invention has closable flaps mounted on one end of the side and end walls and is open at the other end thereof to form, when the flaps are closed, container halves, for use separately or in combination with another container halve as hereinafter described.

BRIEF DESCRIPTION OF THE DRAWINGS

The invention will become more apparent from the following detailed description and drawings in which.

DESCRIPTION OF PREFERRED EMBODIMENT

Referring in more detail to the drawings, the container of the invention is desirably of plastic material which resembles corrugated cardboard in cross section and is desirably a box with flaps, which folds into a closed box for storage and shipment of goods and then unfolds sufficiently for layflat storage and return for reuse.

Figure 1:
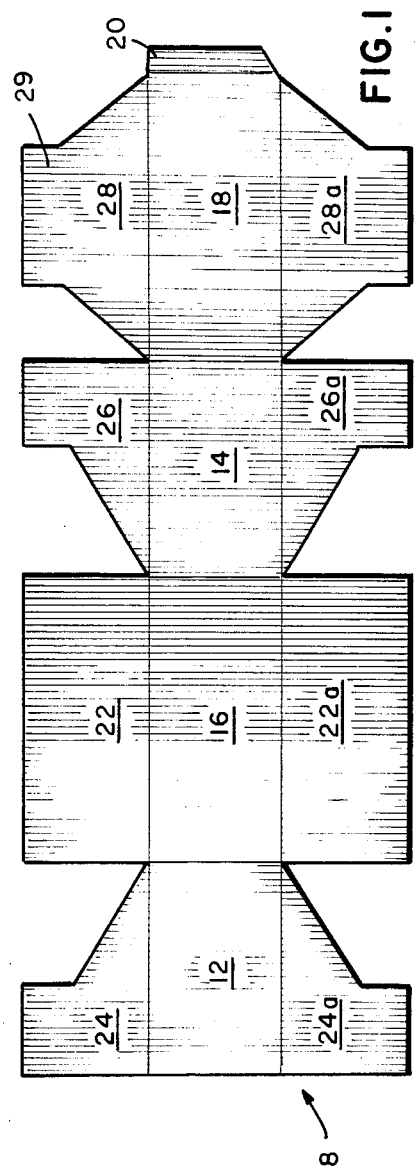
FIG. 1 is a plan view of a cut and scored blank of a container embodying a present invention.
Figure 2:
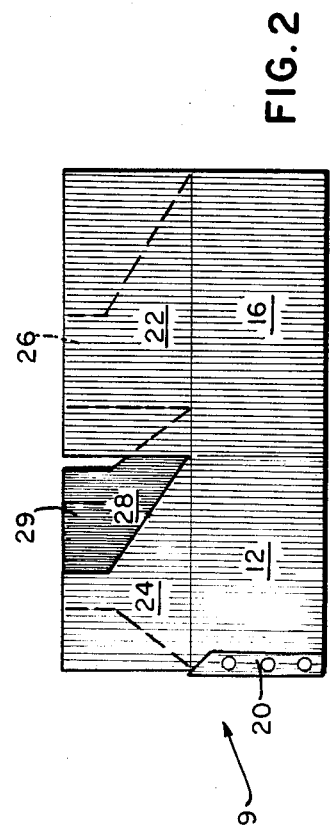
FIG. 2 is a plan view of a cut and scored blank, partially folded, of another container embodying the present invention.

Accordingly, in one embodiment, the box blank 8 has end walls 12 and 14 and side walls 16 and 18, in which the side wall 18 and the end wall 12 are joinable by heat sealed flap 20, as shown in FIG. 1. The box blank 8 further has side and end flaps as described below. In another embodiment, the box portion 9 has the same upper flaps but no lower flaps, as shown in FIG. 2. Both box blanks 8 and 9 fold into a closeable box 10 e.g. as shown in FIG. 3, except that the box blank 8, of FIG. 1, additionally has closable bottom flaps, not shown in FIG. 3, which correspond to the closable upper flaps shown in FIGS. 3, 4 and 5.

Figure 3:
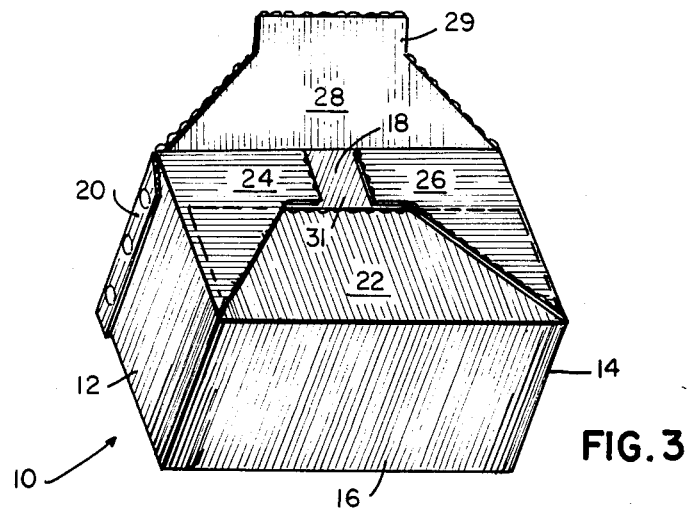
FIG. 3 is an isometric view of a container embodying the invention formed from the blanks of FIGS. 1 or 2, with flaps partially open.

The box blanks 8 and 9, shown in FIGS. 1 and 2 and the box portion 10 shown in FIG. 3, each have side full flap 22, end diagonal flaps 24 and 26 and side pyramid flap 28, having blunt upper tab portion 29, as shown in such Figures. In such blanks, the panels or flaps are hingeably joined on fold lines or scores.

As indicated above, the container embodying the invention can have top flaps and bottom flaps and the discussion of the top upper flaps applies equally to the bottom flaps in those embodiments which have bottom flaps.

Further as indicated the blank of FIG. 1 is folded and sealed at tab 20 to end wall 12, e.g. as indicated in FIG. 2, by heat sealing, gluing, stapling or other fastening means and preferably by heat sealing, to form an open-ended, layflat tube, as indicated in FIG. 2.

Figure 4:
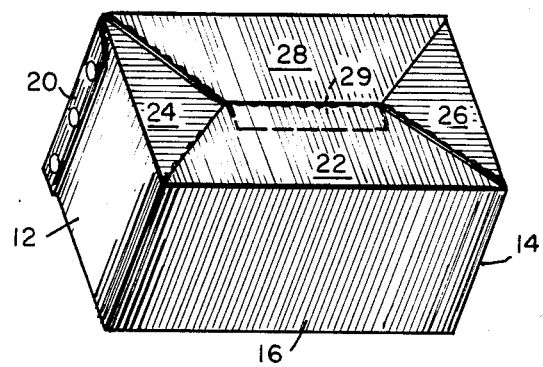
FIG. 4 is an isometric view of the container of FIG. 3 with the flaps closed.
Figure 5:
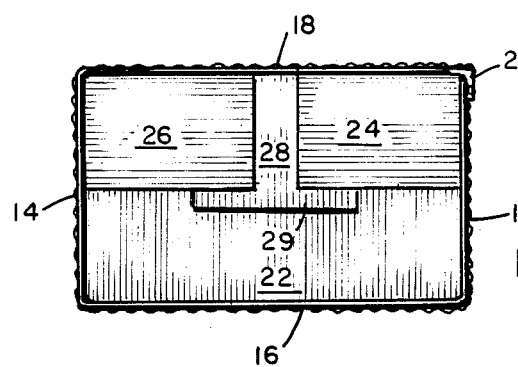
FIG. 5 is a bottom plan view of the container of FIG. 2 with the flaps thereof in the closed position.

Thd flaps fold together as indicated in FIG. 3 as follows:

First side flap 22 is folded, diagonal flaps 24 and 26 are folded thereover, as shown in FIG. 3 and (second side) pyramid flap 28 is folded onto the latter flaps 24 and 26 and against the full flap 22 so that the upper tab portion 29 of the pyramid flap 28, deflects the full flap 22 inwardly enough to permit said tab portion 29 to slip into the slot 31 defined by the flaps 22, 24 and 26 (as indicated in FIG. 3), to lock all four flaps together in the closed position, as shown in FIGS. 4 and 5.

Figure 6:
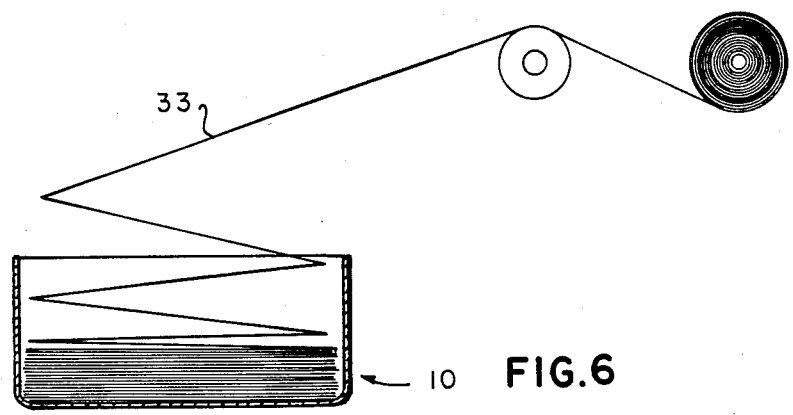
FIG. 6 is a sectional elevation view of the container embodiment of FIG. 5 in use and FIG. 7 is an elevation view of a pair of the container halves of FIG. 5 nested to form a closed container.

The exterior of the folded box portion 10 is shown in FIG. 4 and the interior thereof is shown in FIG. 5. The four flaps stay locked together against the weight of any contents, as indicated in FIGS. 5 and 6. The only way to unlock the flaps is to press against flaps 22 and 28 from the outside of the box portion 10, shown in FIG. 4, which permits the pyramid flap 28, to disengage and swing clear of the full flap 22 and then swing outwardly to the open position shown in FIG. 3. The remaining flaps can then be opened and the container or container half can then be flattened e.g. as shown in FIG. 2, for storage and shipment.

Figure 7:
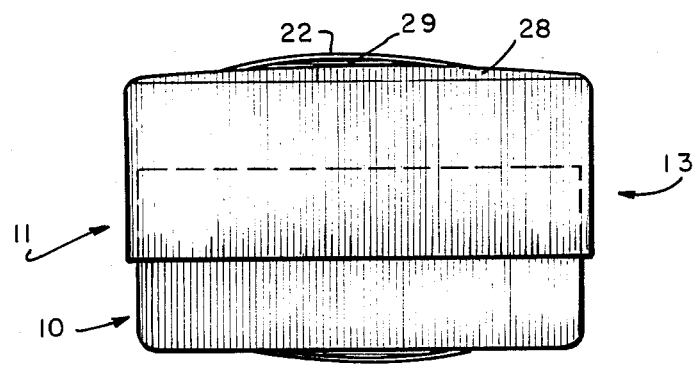

As indicated in FIGS. 3, 4, 5 and 6, the container portion 10 of the invention, forms a half box open at one end thereof, e.g. as shown in FIGS. 5 and 6. This half box 10 fits within (or over) another half box of like construction to define the telescoping closed box assembly 13 of the invention shown in FIG. 7. The box assembly is accordingly expandable to fit various sized contents, as indicated in FIG. 7.

In addition to shipment and storage of products, a box section, e.g. section 10 of the invention can be employed as a dispenser of contents, e.g. computer printout-paper 33, emanating from box portion 10, as shown in FIG. 6.

Likewise as indicated above, instead of a pair of mating box halves, the container embodying the invention can have top and bottom flaps, as indicated in FIG. 1, the flaps closing and interlocking in the manner described above. In such whole container embodiment, the upper flaps can be opened to permit such container to serve as a dispenser of contents in the manner described above with respect to FIG. 6.

The container or box of the invention is made of durable plastic which replaces the not-so-durable cardboard box, which are made less durable by the cut-out flaps of the Prior Art discussed above. Such Prior Art boxes often tear in the shipping or opening thereof and accordingly are not often reused and must be disposed of e.g. by storage and shipment for dumping and/or burning.

The container of the invention is suitable for storage and shipment of various contents e.g. supermarket products or paper products including computer paper products. Preferred for computer paper products is the half-container embodiment. As discussed above the half-container or half-box can fit within or over another half-box of like construction to define a telescoping closed box assembly e.g. as shown in FIG. 7. Additionally, the slot defined by the underflap 22 and the over pyramid flap 28, provides a hand insert or handle for lifting one box portion relative to the other e.g. lifting box half 11 relative to box half 10 as indicated in FIG. 7.

The container embodiments of the invention can be made of various materials e.g. cardboard, corrugated cardboard, plastic or corrugated plastic or other suitable materials. Preferably however, the containers embodying the invention are made of plastic and more preferably of corrugated plastic for high strength, durability and reusability.

As indicated, the side closure flaps of the containers embodying the invention are free of recesses, slots or cutout portions for greater strength and durability. Further the pyramid closure flap, e.g. flap 28, terminates in a blunt, angular or rectangular apex rather than a pointed apex for greater strength and durability.

A further feature of the containers embodying the present invention is that the flaps close in an interlocking manner e.g. as shown in FIG. 5, to provide a reverse opening configuration thereof for self-locking against the weight of the contents of such container. Yet the top container half can be readily opened by pushing downwardly on the upper flaps, e.g. flaps 22 and 28, shown in FIG. 4, from the outside of the upper box portion to disengage and open such slaps as discussed above.

Further the containers embodying the invention are so constructed that only one flap of four is substantially full, the remaining three being of compact size and shape, to effect a significant savings of material in construction of the container blank.

Accordingly the containers embodying the invention have compact self-locking, flaps to provide durable, lightweight and highly reusable containers. The flaps of such containers can be readily opened without damage thereto and such container portions stored in a layflat position taking about five percent of their previous volume for return to the product source, for re-use at a considerable savings of container cost and disposal.

What is claimed is:

1. A container of corrugated plastic web having an opposed pair of side walls joined by a pair of end walls, the first side wall having a first side flap hingeably mounted thereto, which flap has an outside edge that is free of slots or projections for greater strength and durability so as to reduce stress concentration and damage when said flap is opened or closed, each end wall having a hingeably mounted end flap having a slant-edge terminating in an off-center blunt apex and the other side wall having a hingeably mounted second side, triangular flap terminating in a blunt substantially central apex such that said first side flap is foldable toward said container and said end flaps are foldable thereover to define a substantially central slot with said first side flap and said second side flap is foldable over said other flaps, with said central apex being insertable into said slot to interleave said other flaps in an interlocking configuration.

2. The container of claim 1 wherein said first side flap has a straight leading edge.

3. The container of claim 1 wherein each of said end flaps define the base of a right triangle which terminates in a truncated apex.

4. The container of claim 1 wherein said second side flap defines the base of an isosceles triangle which terminates in a blunt angular apex.

5. The container of claim 1 wherein with said flaps open, said first side wall and an end wall are flattenable against said second side wall and the remaining end wall in a lay-flat configuration for storing and shipping thereof.

6. The container of claim 1 having closeable flaps mounted on one end of said walls and open on the other end of said walls so that with said flaps folded and interlocked, a half box is formed which is open on a side opposite said flaps, said flaps being openable to permit the container to be compressed into lay-flat form.

7. The box half of claim 6 in combination with an inverted box half of smaller but like construction such that the first box half fits over the smaller box half to define a closed container.

8. The container of claim 1 having top flaps and similar bottom flaps which are closeable to form a closed container and openable to permit the container to be compressed into lay-flat form.

9. The container of claim 1 wherein said adjacent walls and flaps are integral and defined by fold lines therebetween in the container surface except that a side wall and an adjacent end wall are overlapped and bonded together to define the container wall enclosure and position said flaps for folding into said interlocking configuration.

10. The container of claim 1 being of double-walled plastic layers with a plastic corrugated layer therebetween.

* * * * *